US012258919B2

(12) United States Patent
Iwaki et al.

(10) Patent No.: US 12,258,919 B2
(45) Date of Patent: Mar. 25, 2025

(54) MARINE PROPULSION DEVICE AND MARINE VESSEL

(71) Applicant: YAMAHA HATSUDOKI KABUSHIKI KAISHA, Iwata (JP)

(72) Inventors: Ryutaro Iwaki, Shizuoka (JP); Junsei Suzuki, Shizuoka (JP); Taichiro Nannichi, Shizuoka (JP); Tomoyuki Kashiwayama, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 65 days.

(21) Appl. No.: 18/301,566

(22) Filed: Apr. 17, 2023

(65) Prior Publication Data

US 2023/0332554 A1 Oct. 19, 2023

(30) Foreign Application Priority Data

Apr. 19, 2022 (JP) ................................ 2022-068763

(51) Int. Cl.
*F02D 41/14* (2006.01)
*B63H 21/21* (2006.01)
*F02B 75/18* (2006.01)

(52) U.S. Cl.
CPC ......... *F02D 41/1498* (2013.01); *B63H 21/21* (2013.01); *F02B 75/18* (2013.01); *B63H 2021/216* (2013.01); *F02B 2075/1816* (2013.01); *F02D 2200/101* (2013.01)

(58) Field of Classification Search
CPC ........... F02D 41/1498; F02D 2200/101; F02D 41/045; F02D 41/22; F02D 2200/1015; B63H 21/21; B63H 2021/216; F02B 75/18; F02B 2075/1816
See application file for complete search history.

(56) References Cited

U.S. PATENT DOCUMENTS

2002/0016666 A1* 2/2002 Maegawa .............. G01M 15/11 123/406.24
2013/0096743 A1* 4/2013 Kado .................. F02D 41/0097 701/21

FOREIGN PATENT DOCUMENTS

JP 2011026977 A * 2/2011
JP 2013-086559 A 5/2013
JP 5260432 B2 * 8/2013

* cited by examiner

*Primary Examiner* — Joseph J Dallo
(74) *Attorney, Agent, or Firm* — Keating & Bennett, LLP

(57) ABSTRACT

A marine propulsion device includes a controller configured or programmed to perform a control to suppress an engine rotation speed. The controller is configured or programmed to perform an initial misfire control to determine whether or not a cylinder of the engine is caused to misfire in order to suppress the engine rotation speed when it is determined that an initial sudden increase in the engine rotation speed that causes over-revving has occurred based on a detection result from a rev-up detector, and perform a subsequent misfire control to determine whether or not the cylinder is caused to misfire in order to suppress the engine rotation speed when it is determined that a subsequent sudden increase in the engine rotation speed that causes the over-revving has occurred following the initial sudden increase in the engine rotation speed based on the detection result from the rev-up detector.

20 Claims, 5 Drawing Sheets

MARINE PROPULSION DEVICE AND MARINE VESSEL

CROSS REFERENCE TO RELATED APPLICATIONS

This application claims the benefit of priority to Japanese Patent Application No. 2022-068763 filed on Apr. 19, 2022. The entire contents of this application are hereby incorporated herein by reference.

BACKGROUND OF THE INVENTION

1. Field of the Invention

The present invention relates to a marine propulsion device and a marine vessel each including a controller that performs a control to suppress an engine rotation speed by misfiring.

2. Description of the Related Art

A marine propulsion device and a marine vessel each including a controller that performs a control to suppress an engine rotation speed by misfiring is known in general. Such a marine propulsion device and a marine vessel are disclosed in Japanese Patent Laid-Open No. 2013-086559, for example.

Japanese Patent Laid-Open No. 2013-086559 discloses a marine propulsion device including a four-cylinder engine, a rotational speed detector that detects an engine rotational speed, and a controller that performs a control to suppress the engine rotational speed by misfiring. The controller performs a control taking into consideration the rate of change of the engine rotational speed in order to reduce or prevent a sharp rise that causes over-revving in which the engine rotational speed increases suddenly when a propeller rotates in the air, for example, and a control taking into consideration the engine rotational speed regardless of the rate of change of the engine rotational speed.

Specifically, at the time of over-revving, the controller performs a control to suppress the engine rotational speed by causing all cylinders to misfire based on the rate of change of the engine rotational speed (engine rotation speed) exceeding a predetermined value and a control to suppress the engine rotational speed by changing the number of misfiring cylinders according to the engine rotational speed. The controller performs both of the two controls while over-revving continues.

However, in the marine propulsion device described in Japanese Patent Laid-Open No. 2013-086559, the controller performs misfires in consideration of the rate of change of the engine rotational speed (engine rotation speed), and thus even when an initial sharp rise that causes over-revving in which in particular, the rate of change of the engine rotational speed tends to increase and the engine rotational speed tends to increase suddenly is reduced or prevented, unnecessary misfires may be performed based on the rate of change of the engine rotational speed in a subsequent sharp rise that causes over-revving after the initial sharp rise that causes over-revving. In other words, the rate of change of the engine rotational speed tends to be smaller in the subsequent sharp rise that causes over-revving as compared with the initial sharp rise, but the rate of change of the engine rotational speed may temporarily increase. Even in such a case, a control is performed to cause all of the cylinders to misfire such that the engine rotational speed may temporarily decrease significantly, and the engine rotational speed fluctuation may become unstable (the fluctuation range may increase). Therefore, it is conventionally desired to stabilize the engine rotational speed at the time of the sharp rise that causes over-revving.

SUMMARY OF THE INVENTION

Preferred embodiments of the present invention provide marine propulsion devices and marine vessels that each stabilize engine rotation speeds at the time of a sharp rise that causes over-revving.

A marine propulsion device according to a preferred embodiment of the present invention includes an engine, a rev-up detector to detect a sudden increase in an engine rotation speed, and a controller configured or programmed to perform a control to suppress the engine rotation speed. The controller is configured or programmed to perform an initial misfire control to determine whether or not a cylinder of the engine is caused to misfire in order to suppress the engine rotation speed when it is determined that an initial sudden increase in the engine rotation speed that causes over-revving has occurred based on a detection result from the rev-up detector, and perform a subsequent misfire control to determine whether or not the cylinder is caused to misfire in order to suppress the engine rotation speed when it is determined that a subsequent sudden increase in the engine rotation speed that causes the over-revving has occurred following the initial sudden increase in the engine rotation speed based on the detection result from the rev-up detector.

In the marine propulsion device according to a preferred embodiment of the present invention, the controller is configured or programmed to perform the initial misfire control to determine whether or not the cylinder of the engine is caused to misfire in order to suppress the engine rotation speed when it is determined that the initial sudden increase in the engine rotation speed that causes the over-revving has occurred based on the detection result from the rev-up detector, and perform the subsequent misfire control to determine whether or not the cylinder is caused to misfire in order to suppress the engine rotation speed when it is determined that the subsequent sudden increase in the engine rotation speed that causes the over-revving has occurred following the initial sudden increase in the engine rotation speed based on the detection result from the rev-up detector. Accordingly, the initial sudden increase in the engine rotation speed that causes the over-revving and the subsequent sudden increase in the engine rotation speed that causes the over-revving following the initial sudden increase in the engine rotation speed are reduced or prevented by the initial misfire control and the subsequent misfire control that are different from each other. That is, the misfire control for an initial sharp rise that causes the over-revving in which in particular, the rate of change of the engine rotation speed tends to increase and the engine rotation speed tends to increase suddenly, and the misfire control for a subsequent sharp rise that causes the over-revving are clearly separated. Furthermore, in the subsequent misfire control, a misfire of the cylinder is not performed in consideration of the rate of change of the engine rotation speed, and thus when the subsequent sudden increase in the engine rotation speed is reduced or prevented, conventional unnecessary misfires are reduced or prevented. Consequently, the engine rotation speed is stabilized at the time of the sharp rise that causes the over-revving.

A marine propulsion device according to a preferred embodiment of the present invention preferably further includes a rotation speed detector to detect the engine rotation speed, and the controller is preferably configured or programmed to start the initial misfire control when it is determined that the engine rotation speed has changed from lower than a first rotation speed, which is a predetermined rotation speed equal to or higher than a full-open rotation speed at which an opening degree of a throttle valve of the engine is substantially fully opened, to the first rotation speed or higher. Accordingly, the engine rotation speed has changed from lower than the first rotation speed, which is the predetermined rotation speed equal to or higher than the full-open rotation speed at which the opening degree of the throttle valve of the engine is substantially fully opened, to the first rotation speed or higher such that the occurrence of the initial sudden increase in the engine rotation speed that causes the over-revving is easily predicted, and the initial misfire control is started.

In a marine propulsion device according to a preferred embodiment of the present invention, the controller is preferably configured or programmed to, when it is determined that an index value indicating a rate of change of the engine rotation speed is equal to or greater than a predetermined threshold based on the detection result from the rev-up detector in the initial misfire control, determine that the initial sudden increase in the engine rotation speed that causes the over-revving has occurred and cause the cylinder to misfire. Accordingly, the controller determines that the index value indicating the rate of change of the engine rotation speed is equal to or greater than the predetermined threshold to accurately determine that the initial sudden increase in the engine rotation speed that causes the over-revving has occurred. Therefore, in the initial misfire control, the cylinder is caused to misfire at an appropriate timing.

In such a case, the controller is preferably configured or programmed to terminate the initial misfire control and start the subsequent misfire control when it is determined that the engine rotation speed satisfies a predetermined termination condition in the initial misfire control. Accordingly, the subsequent misfire control is started at the time at which the initial sudden increase in the engine rotation speed that causes the over-revving ends and the subsequent sudden increase in the engine rotation speed that causes the over-revving begins.

In a marine propulsion device including the controller configured or programmed to terminate the initial misfire control and start the subsequent misfire control when it is determined that the engine rotation speed satisfies the predetermined termination condition, the controller is preferably configured or programmed to determine again whether or not the index value indicating the rate of change of the engine rotation speed is equal to or greater than the predetermined threshold when it is determined that the engine rotation speed does not satisfy the predetermined termination condition. Accordingly, when the engine rotation speed is expected to still increase in the initial misfire control, it is again determined whether or not the index value indicating the rate of change of the engine rotation speed is equal to or greater than the predetermined threshold in order to cause the cylinder to misfire without terminating the initial misfire control.

In a marine propulsion device including the controller configured or programmed to terminate the initial misfire control and start the subsequent misfire control when it is determined that the engine rotation speed satisfies the predetermined termination condition, the controller is preferably configured or programmed to determine that the engine rotation speed satisfies the predetermined termination condition when the index value indicating the rate of change of the engine rotation speed has changed to a predetermined rate of change or lower in the initial misfire control. Accordingly, at the time at which the subsequent sudden increase in the engine rotation speed that causes the over-revving begins, the initial misfire control is terminated, and the subsequent misfire control is started.

In such a case, the controller is preferably configured or programmed to determine that the engine rotation speed satisfies the predetermined termination condition when the index value indicating the rate of change of the engine rotation speed has changed to 0 or less in the initial misfire control. Accordingly, at the time at which the engine rotation speed stops increasing, the initial misfire control is terminated, and the subsequent misfire control is started.

A marine propulsion device including the controller configured or programmed to terminate the initial misfire control and start the subsequent misfire control when it is determined that the engine rotation speed satisfies the predetermined termination condition preferably further includes a rotation speed detector to detect the engine rotation speed, and the controller is preferably configured or programmed to, in the initial misfire control, determine that the engine rotation speed satisfies the predetermined termination condition when the engine rotation speed has become higher than a second rotation speed or when the engine rotation speed has become equal to or lower than the second rotation speed after becoming higher than the second rotation speed. Accordingly, the initial misfire control is switched to the subsequent misfire control based on the second rotation speed taking into consideration an allowable rotation speed that must be prevented from being reached.

In a marine propulsion device including the controller configured or programmed to, when it is determined that the index value indicating the rate of change of the engine rotation speed is equal to or greater than the predetermined threshold, cause the cylinder to misfire, the cylinder of the engine preferably includes a plurality of cylinders, and the controller is preferably configured or programmed to cause all of the cylinders to misfire when it is determined that the index value indicating the rate of change of the engine rotation speed is equal to or greater than the predetermined threshold in the initial misfire control. Accordingly, all of the cylinders are caused to misfire such that the initial sharp rise that causes the over-revving in which the engine rotation speed increases suddenly is effectively reduced or prevented.

In a marine propulsion device including the controller configured or programmed to, when it is determined that the index value indicating the rate of change of the engine rotation speed is equal to or greater than the predetermined threshold, cause the cylinder to misfire, the cylinder of the engine preferably includes a plurality of cylinders, and the controller is preferably configured or programmed to increase a number of misfiring cylinders as the index value indicating the rate of change of the engine rotation speed increases when it is determined that the index value indicating the rate of change of the engine rotation speed is equal to or greater than the predetermined threshold in the initial misfire control. Accordingly, the number of misfiring cylinders is varied when the rate of change of the engine rotation speed is particularly high or particularly low in the initial misfire control. Therefore, the engine rotation speed is further stabilized at the time of the sharp rise that causes the over-revving.

In a marine propulsion device including the controller configured or programmed to, when it is determined that the index value indicating the rate of change of the engine rotation speed is equal to or greater than the predetermined threshold, cause the cylinder to misfire, the index value indicating the rate of change of the engine rotation speed is preferably the engine rotation speed used to calculate the rate of change of the engine rotation speed, a load value of a fuel injector of the engine that changes in conjunction with the rate of change of the engine rotation speed, or an opening degree value of a throttle valve of the engine that changes in conjunction with the rate of change of the engine rotation speed. Accordingly, in engines of various specifications with different detectable index values, misfires of the cylinders are controlled.

In a marine propulsion device including the controller configured or programmed to start the initial misfire control when it is determined that the engine rotation speed has changed from lower than the first rotation speed to the first rotation speed or higher, the controller is preferably configured or programmed to cause the cylinder to misfire when the engine rotation speed is equal to or higher than a misfire rotation speed higher than the first rotation speed in the subsequent misfire control. Accordingly, the misfire rotation speed is set to a relatively high value in the subsequent misfire control such that the engine rotation speed is maintained at a relatively high value in the subsequent misfire control.

In such a case, the cylinder of the engine preferably includes four cylinders, the misfire rotation speed preferably includes a first misfire rotation speed, a second misfire rotation speed higher than the first misfire rotation speed, a third misfire rotation speed higher than the second misfire rotation speed, and a fourth misfire rotation speed higher than the third misfire rotation speed, the controller is preferably configured or programmed to cause one of the four cylinders to misfire when the engine rotation speed is equal to or higher than the first misfire rotation speed and lower than the second misfire rotation speed in the subsequent misfire control, cause two of the four cylinders to misfire when the engine rotation speed is equal to or higher than the second misfire rotation speed and lower than the third misfire rotation speed in the subsequent misfire control, cause three of the four cylinders to misfire when the engine rotation speed is equal to or higher than the third misfire rotation speed and lower than the fourth misfire rotation speed in the subsequent misfire control, and cause all of the four cylinders to misfire when the engine rotation speed is equal to or higher than the fourth misfire rotation speed in the subsequent misfire control, and a difference between the second misfire rotation speed and the third misfire rotation speed and a difference between the third misfire rotation speed and the fourth misfire rotation speed are preferably greater than a difference between the first misfire rotation speed and the second misfire rotation speed. Accordingly, the third misfire rotation speed and the fourth misfire rotation speed are set to a relatively high value with respect to the first misfire rotation speed and the second misfire rotation speed, and thus in the subsequent misfire control, misfires of a large number of cylinders that significantly decrease the engine rotation speed are reduced or prevented. Consequently, the engine rotation speed is further stabilized at the time of the sharp rise that causes the over-revving.

In a marine propulsion device including the controller configured or programmed to cause the cylinder to misfire when the engine rotation speed is equal to or higher than the misfire rotation speed in the subsequent misfire control, the controller is preferably configured or programmed to terminate the subsequent misfire control when it is determined that the engine rotation speed has become lower than the first rotation speed. Accordingly, based on the engine rotation speed, it is determined that the subsequent sudden increase in the engine rotation speed that causes the over-revving has ceased, and the subsequent misfire control is terminated.

In a marine propulsion device including the controller configured or programmed to start the initial misfire control when it is determined that the engine rotation speed has changed from lower than the first rotation speed to the first rotation speed or higher, the first rotation speed is preferably 5,000 rpm, for example, or more and 10,000 rpm or less, for example. Accordingly, when the engine rotation speed is less than 5,000 rpm and when the engine rotation speed is more than 10,000 rpm, the initial misfire control is prevented from being started.

A marine vessel according to a preferred embodiment of the present invention includes a hull, and a marine propulsion device provided on the hull. The marine propulsion device includes an engine, a rev-up detector to detect a sudden increase in an engine rotation speed, and a controller configured or programmed to perform a control to suppress the engine rotation speed. The controller is configured or programmed to perform an initial misfire control to determine whether or not a cylinder of the engine is caused to misfire in order to suppress the engine rotation speed when it is determined that an initial sudden increase in the engine rotation speed that causes over-revving has occurred based on a detection result from the rev-up detector, and perform a subsequent misfire control to determine whether or not the cylinder is caused to misfire in order to suppress the engine rotation speed when it is determined that a subsequent sudden increase in the engine rotation speed that causes the over-revving has occurred following the initial sudden increase in the engine rotation speed based on the detection result from the rev-up detector.

In a marine vessel according to a preferred embodiment of the present invention, the controller is configured or programmed to perform the initial misfire control to determine whether or not the cylinder of the engine is caused to misfire in order to suppress the engine rotation speed when it is determined that the initial sudden increase in the engine rotation speed that causes the over-revving has occurred based on the detection result from the rev-up detector, and perform the subsequent misfire control to determine whether or not the cylinder is caused to misfire in order to suppress the engine rotation speed when it is determined that the subsequent sudden increase in the engine rotation speed that causes the over-revving has occurred following the initial sudden increase in the engine rotation speed based on the detection result from the rev-up detector. Accordingly, the initial sudden increase in the engine rotation speed that causes the over-revving and the subsequent sudden increase in the engine rotation speed that causes the over-revving following the initial sudden increase in the engine rotation speed are reduced or prevented by the initial misfire control and the subsequent misfire control different from each other. That is, the misfire control for an initial sharp rise that causes the over-revving in which in particular, the rate of change of the engine rotation speed tends to increase and the engine rotation speed tends to increase suddenly, and the misfire control for a subsequent sharp rise that causes the over-revving are clearly separated. Furthermore, in the subsequent misfire control, a misfire of the cylinder is not performed in consideration of the rate of change of the engine rotation speed, and thus when the subsequent sudden increase in the engine rotation speed is reduced or prevented, conventional unnecessary misfires are reduced or prevented. Consequently, the engine rotation speed is stabilized at the time of the sharp rise that causes the over-revving.

In a marine vessel according to a preferred embodiment of the present invention, the marine propulsion device preferably further includes a rotation speed detector to detect the engine rotation speed, and the controller is preferably configured or programmed to start the initial misfire control when it is determined that the engine rotation speed has changed from lower than a first rotation speed, which is a predetermined rotation speed equal to or higher than a full-open rotation speed at which an opening degree of a throttle valve of the engine is substantially fully opened, to the first rotation speed or higher. Accordingly, the engine rotation speed has changed from lower than the first rotation speed, which is the predetermined rotation speed equal to or higher than the full-open rotation speed at which the opening degree of the throttle valve of the engine is substantially fully opened, to the first rotation speed or higher such that the occurrence of the initial sudden increase in the engine rotation speed that causes the over-revving is easily predicted, and the initial misfire control is started.

In a marine vessel according to a preferred embodiment of the present invention, the controller is preferably configured or programmed to, when it is determined that an index value indicating a rate of change of the engine rotation speed is equal to or greater than a predetermined threshold based on the detection result from the rev-up detector in the initial misfire control, determine that the initial sudden increase in the engine rotation speed that causes the over-revving has occurred and cause the cylinder to misfire. Accordingly, the controller determines that the index value indicating the rate of change of the engine rotation speed is equal to or greater than the predetermined threshold to accurately determine that the initial sudden increase in the engine rotation speed that causes the over-revving has occurred. Therefore, in the initial misfire control, the cylinder is caused to misfire at an appropriate timing.

In such a case, the controller is preferably configured or programmed to terminate the initial misfire control and start the subsequent misfire control when it is determined that the engine rotation speed satisfies a predetermined termination condition in the initial misfire control. Accordingly, the subsequent misfire control is started at the time at which the initial sudden increase in the engine rotation speed that causes the over-revving ends and the subsequent sudden increase in the engine rotation speed that causes the over-revving begins.

In a marine vessel including the controller configured or programmed to terminate the initial misfire control and start the subsequent misfire control when it is determined that the engine rotation speed satisfies the predetermined termination condition, the controller is preferably configured or programmed to determine again whether or not the index value indicating the rate of change of the engine rotation speed is equal to or greater than the predetermined threshold when it is determined that the engine rotation speed does not satisfy the predetermined termination condition. Accordingly, when the engine rotation speed is expected to still increase in the initial misfire control, it is again determined whether or not the index value indicating the rate of change of the engine rotation speed is equal to or greater than the predetermined threshold in order to cause the cylinder to misfire without terminating the initial misfire control.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

The structure of a marine vessel 100 including an outboard motor 101 according to preferred embodiments of the present invention is now described with reference to FIGS. 1 to 5. The outboard motor 101 is an example of a "marine propulsion device".

Figure 1:
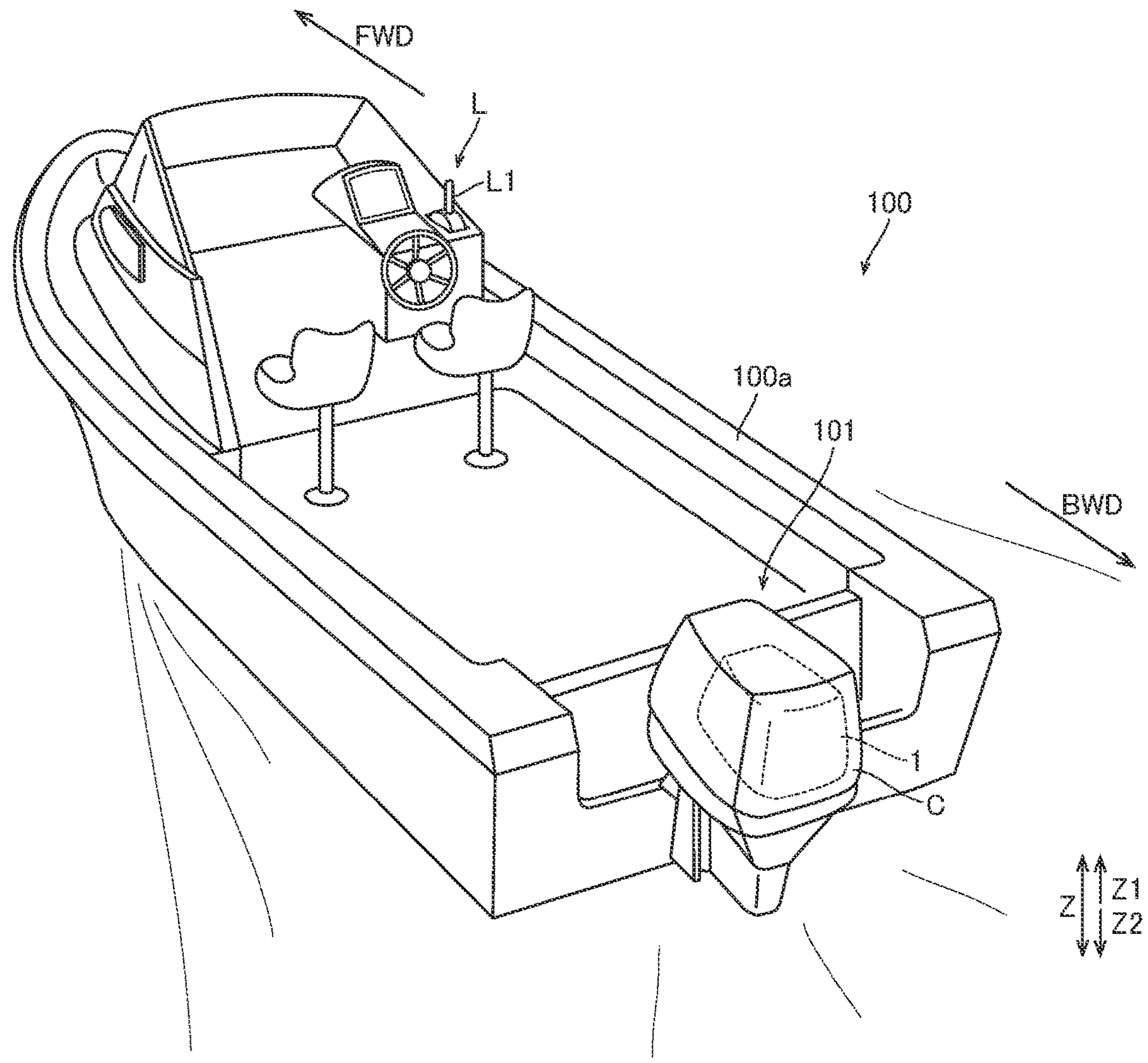
FIG. 1 is a perspective view showing a marine vessel including an outboard motor according to a preferred embodiment of the present invention.

As shown in FIG. 1, the marine vessel 100 includes a hull **100*a*, a remote control lever L, and the outboard motor 101. The outboard motor 101 is provided at a stern of the hull 100*a***.

The outboard motor 101 (controller 5) according to preferred embodiments of the present invention performs an initial misfire control to determine whether or not cylinders **1*a* of an engine 1 are caused to misfire in order to suppress an engine rotation speed N (see FIG. 6) when it is determined that an initial sudden increase in the engine rotation speed N that causes over-revving has occurred, and performs a subsequent misfire control to determine whether or not the cylinders 1*a* of the engine 1** are caused to misfire in order to suppress the engine rotation speed N when it is determined that a subsequent sudden increase in the engine rotation speed N that causes over-revving has occurred following the initial sudden increase in the engine rotation speed.

That is, the outboard motor 101 (controller 5) performs a control suitable for each situation by separating a control to suppress the engine rotation speed N into a control for the initial sudden increase in the engine rotation speed N that causes over-revving and a control for the subsequent sudden increase in the engine rotation speed N that causes over-revving. The details are described below.

The outboard motor 101 (controller 5) performs the initial misfire control and the subsequent misfire control during over-revving to prevent the engine rotation speed N from becoming higher than an allowable rotation speed and to decrease the fluctuation range of the engine rotation speed N during over-revving.

A user operates the outboard motor 101 using the remote control lever L. The remote control lever L is an operator to switch the outboard motor 101 to a neutral state, a forward movement state, or a reverse movement state. The remote control lever L is also an operator to adjust the engine rotation speed N (thrust force) of the outboard motor 101.

Specifically, the remote control lever L transmits, to the controller 5 of the outboard motor 101, a signal (a neutral signal, a forward movement signal, or a reverse movement signal) to switch the outboard motor 101 to the neutral state, the forward movement state, or the reverse movement state based on a user's switching operation. The remote control lever L includes an operation lever L1 and a lever position sensor (not shown).

The operation lever L1 of the remote control lever L is tilted forward from the neutral state in which the operation lever L1 extends straight up by a predetermined angle to switch the outboard motor 101 from the neutral state to the forward movement state. Furthermore, the operation lever L1 of the remote control lever L is tilted rearward from the neutral state in which the operation lever L1 extends straight up by a predetermined angle to switch the outboard motor 101 from the neutral state to the reverse movement state.

The remote control lever L transmits, to the controller 5, a signal to change the opening degree of a throttle valve 10 of the outboard motor 101 based on a user's switching operation.

Figure 2:
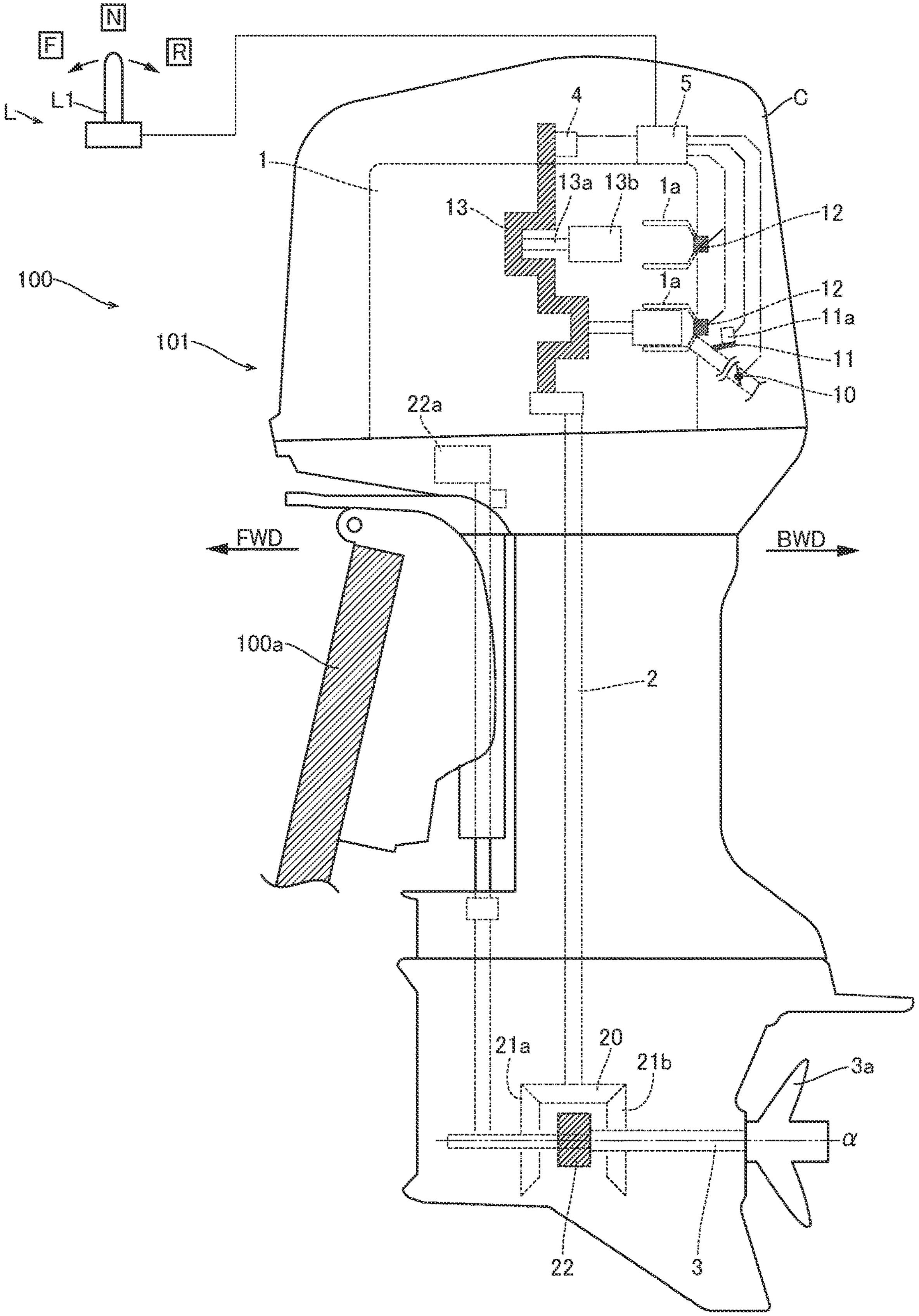
FIG. 2 is a side view showing an outboard motor according to a preferred embodiment of the present invention.
Figure 3:
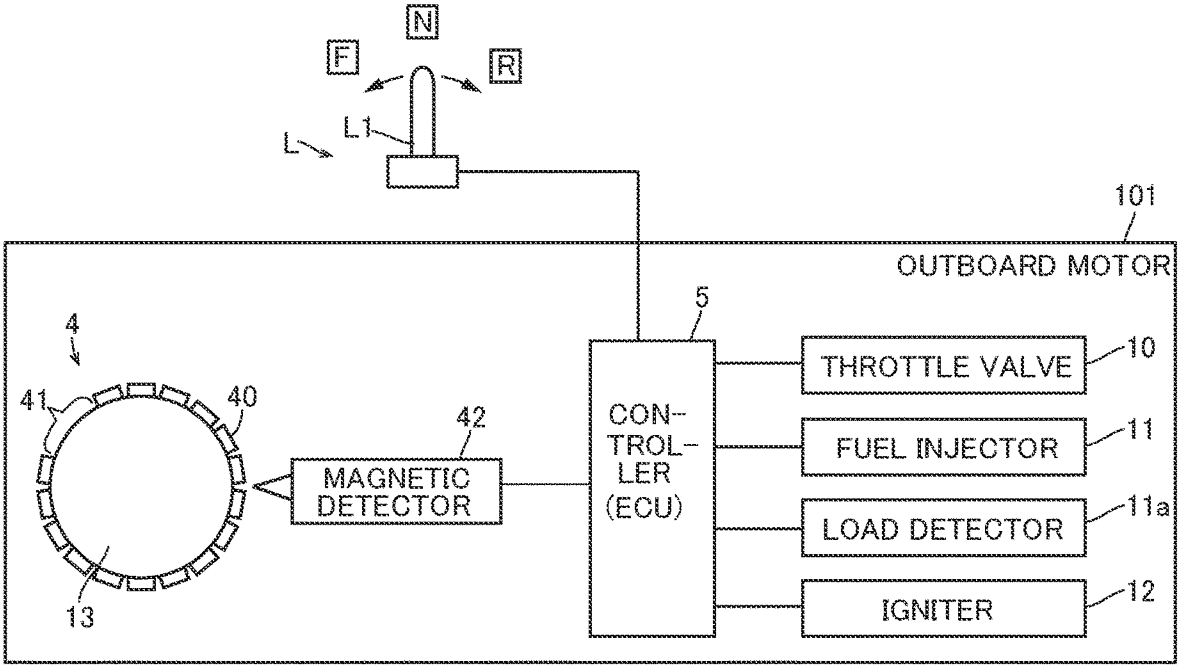
FIG. 3 is a block diagram showing an outboard motor and a remote control lever according to a preferred embodiment of the present invention.

As shown in FIGS. 2 and 3, only one outboard motor 101 is provided at the stern of the hull 100*a*. The outboard motor 101 includes the engine 1, a drive shaft 2, a propeller shaft 3 including a propeller 3*a*, a rotation speed detector 4, and the controller 5. The rotation speed detector 4 is an example of a "rev-up detector".

The engine 1 is provided inside a cowling C located at the top of an outboard motor body. The engine 1 generates a torque to drive the propeller 3*a*. As an example, the engine 1 is a V-type or V-shaped engine including four cylinders 1*a* (only two cylinders 1*a* are shown in FIG. 2). The engine may be an in-line engine, for example, instead of a V-type or V-shaped engine.

The engine 1 includes the throttle valve 10, a fuel injector 11, igniters 12, and a crankshaft 13.

The throttle valve 10 is provided in an intake passage for air to be supplied to a combustion chamber, and freely changes an opening degree value (opening degree ratio) of the intake passage. The throttle valve 10 adjusts the amount of air to be supplied to the combustion chamber by changing the opening degree value. As the opening degree value of the throttle valve 10 increases, the engine rotation speed N (thrust force) of the outboard motor 101 increases, and as the opening degree value of the throttle valve 10 decreases, the engine rotation speed N of the outboard motor 101 decreases. The throttle valve 10 is driven and controlled by the controller 5 that has acquired a signal from the remote control lever L to change the opening degree value.

The fuel injector 11 is provided at the intake passage for air to be supplied to the combustion chamber, and injects fuel into the intake passage to generate a mixture of air and fuel. The fuel injector 11 includes a load detector 11*a* that detects a load value associated with fuel injection of the fuel injector 11. The controller 5 acquires the detection results of the load detector 11*a*. As the load value detected by the load detector 11*a* increases, the engine rotation speed N of the outboard motor 101 increases, and as the load value decreases, the engine rotation speed N of the outboard motor 101 decreases.

The igniters 12 ignite the compressed air-fuel mixture in the combustion chamber. The igniters 12 are driven and controlled by the controller 5.

The crankshaft 13 rotates about a rotation center axis (not shown). The crankshaft 13 is connected to pistons 13*b* via connecting rods 13*a*, and rotates by the driving forces of the pistons 13*b* that reciprocate horizontally.

The drive shaft 2 includes an upper end connected to the crankshaft 13 and rotates together with the crankshaft 13. A bevel gear 20 is provided at the lower end of the drive shaft 2. The bevel gear 20 constantly meshes with both a forward movement gear 21*a* and a reverse movement gear 21*b*. The forward movement gear 21*a* and the reverse movement gear 21*b* rotate about a rotation center axis a (see FIG. 2) of the propeller shaft 3. The forward movement gear 21*a* and the reverse movement gear 21*b* rotate in directions opposite to each other.

A dog clutch 22 is provided between the forward movement gear 21*a* and the reverse movement gear 21*b*. The outboard motor 101 is in the neutral state in which the propeller 3*a* does not rotate when the dog clutch 22 does not mesh with either the forward movement gear 21*a* or the reverse movement gear 21*b*.

The dog clutch 22 is moved forward by a shift actuator 22*a* and meshes with the forward movement gear 21*a* based on an operation on the remote control lever L such that the outboard motor 101 shifts from the neutral state to the forward movement state in which a rotation force is transmitted from the forward movement gear 21*a* (engine 1) to the propeller shaft 3.

The dog clutch 22 is moved rearward by the shift actuator 22*a* and meshes with the reverse movement gear 21*b* based on an operation on the remote control lever L such that the outboard motor 101 shifts from the neutral state to the reverse movement state in which a rotation force is transmitted from the reverse movement gear 21*b* (engine 1) to the propeller shaft 3.

Figure 6:
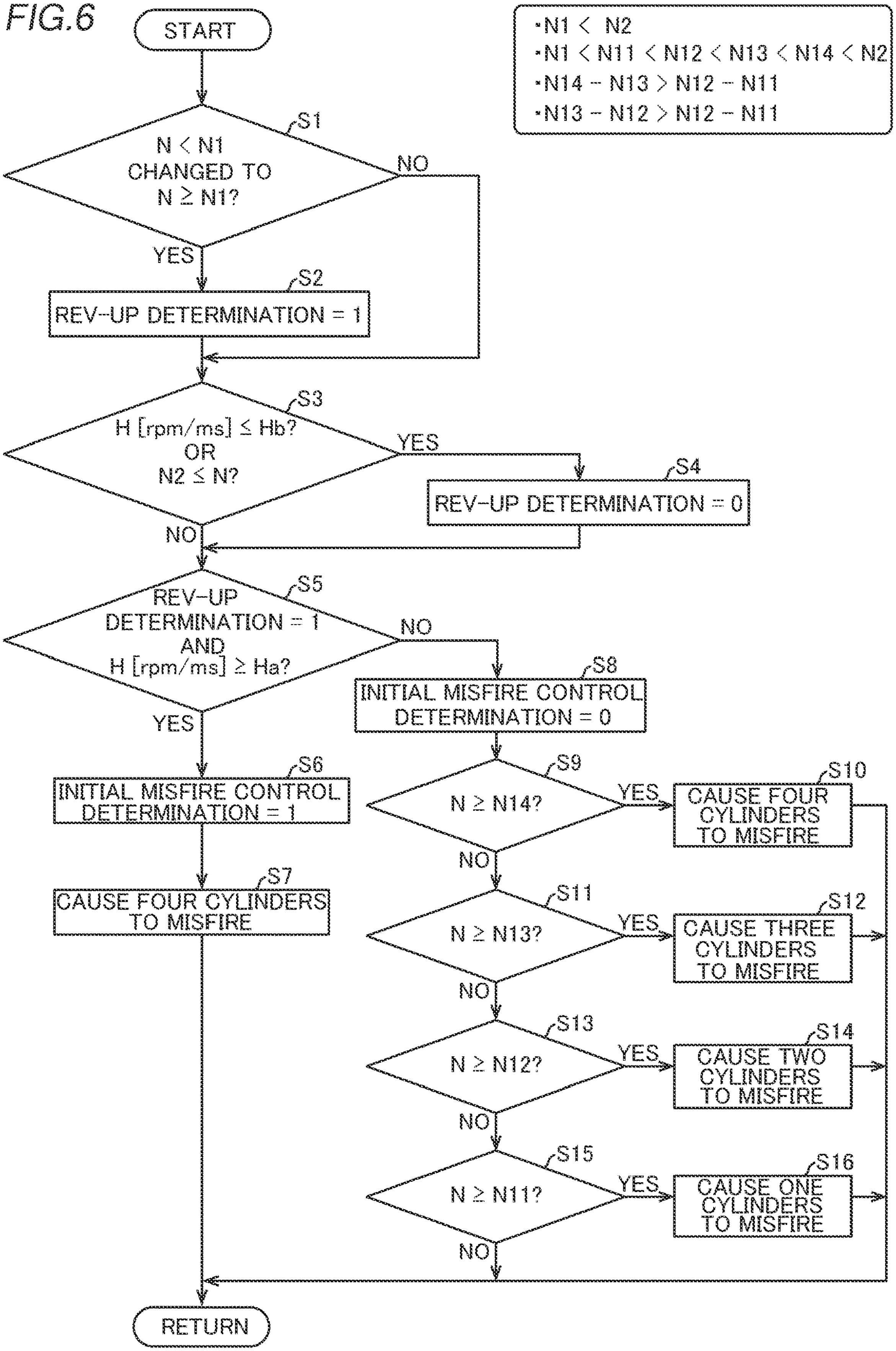
FIG. 6 is a flowchart of a control process in an initial misfire control and a subsequent misfire control performed by a controller of an outboard motor according to a preferred embodiment of the present invention.

The rotation speed detector 4 detects the engine rotation speed N (see FIG. 6). The rotation speed detector 4 is a crank sensor provided on the crankshaft 13 to detect the engine rotation speed N by detecting the rotation state of the crankshaft 13.

As an example, the rotation speed detector 4 is a non-contact magnetic sensor. The rotation speed detector 4 includes a plurality of protrusions 40 provided on a portion of the crankshaft 13 in a rotation direction, a non-protrusion 41 provided on a portion of the crankshaft 13 in the rotation direction, and a magnetic detector 42 that detects the magnetism of the rotating crankshaft 13. The rotation speed detector 4 detects, by the magnetic detector 42, magnetic fluctuations caused by switching between a state in which the magnetic detector 42 faces the protrusions 40 and a state in which the magnetic detector 42 faces the non-protrusion 41 as the crankshaft 13 rotates to detect the engine rotation speed N. The controller 5 acquires the detection results of the rotation speed detector 4.

The rotation speed detector 4 is used to detect that the engine rotation speed N has increased suddenly when the initial misfire control and the subsequent misfire control described below are performed by the controller 5.

The controller 5 includes a control circuit, and includes a board including a central processing unit (CPU), a memory, etc. The controller 5 is an engine control unit (ECU). The controller 5 controls driving of the outboard motor 101 based on operations on various operators such as the remote control lever L and a steering wheel provided on the hull 100*a*.

The controller 5 performs a control to suppress the engine rotation speed N. For example, when it is determined that the initial sudden increase in the engine rotation speed N that causes over-revving has occurred based on the detection results of the rotation speed detector 4, the controller 5 performs the initial misfire control to determine whether or not the cylinders 1*a* are caused to misfire in order to suppress the engine rotation speed N. When the cylinders 1*a* are caused to misfire in the initial misfire control, the controller 5 causes all of the cylinders 1*a* (four cylinders 1*a*) to misfire.

The controller 5 determines that the initial sudden increase in the engine rotation speed N that causes over-revving has occurred when it is determined that an index value indicating the rate of change of the engine rotation speed N is equal to or greater than a predetermined threshold Ha based on the detection results of the rotation speed detector 4 in the initial misfire control, and causes the cylinders 1*a* to misfire. The index value refers to the engine rotation speed N used to calculate the rate of change of the engine rotation speed N. The index value may be a load value of the fuel injector 11 of the engine 1 that changes in conjunction with the rate of change of the engine rotation speed N, or the opening degree value of the throttle valve 10 of the engine 1 that changes in conjunction with the rate of change of the engine rotation speed N.

When it is determined that the subsequent sudden increase in the engine rotation speed N that causes over-revving has occurred following the initial sudden increase in the engine rotation speed N based on the detection results of the rotation speed detector 4, the controller 5 performs the subsequent misfire control to determine whether or not the cylinders 1*a* are caused to misfire in order to suppress the engine rotation speed N. The controller 5 increases the number of misfiring cylinders 1*a* as the engine rotation speed N increases when causing the cylinders 1*a* to misfire in the subsequent misfire control.

The initial misfire control is not repeatedly performed after the initial misfire control is terminated, and the subsequent misfire control is started after the initial misfire control is terminated.

A control process of the initial misfire control and the subsequent misfire control performed by the controller 5 is now described along a flowchart with reference to FIG. 6.

In step S1, it is determined whether or not the engine rotation speed N has changed from lower than a first rotation speed N1, which is a predetermined rotation speed equal to or higher than a full-open rotation speed at which the opening degree of the throttle valve 10 of the engine 1 is substantially fully opened, to the first rotation speed N1 or higher. When it is determined that the engine rotation speed N has changed to the first rotation speed N1 or higher, the process advances to step S2. When it is determined that the engine rotation speed N has not changed to the first rotation speed N1 or higher, the process advances to step S3. As an example, the first rotation speed N1 is 5,000 rpm or more, and 10,000 rpm or less. As a specific example, the first rotation speed N1 is 8,000 rpm, and the full-open rotation speed is 7,600 rpm.

In step S2, a rev-up determination is set to 1. Then, the process advances to step S3.

In step S3, it is determined whether or not the engine rotation speed N satisfies a predetermined termination condition.

Specifically, in step S3, it is determined whether or not at least one of two termination conditions is satisfied, and when it is determined that at least one of the two termination conditions is satisfied, the process advances to step S4. When it is determined that neither of the two termination conditions is satisfied, the process advances to step S5. Determining whether or not at least one of the two termination conditions is satisfied refers to a determination regarding the following two termination conditions.

Figure 4:
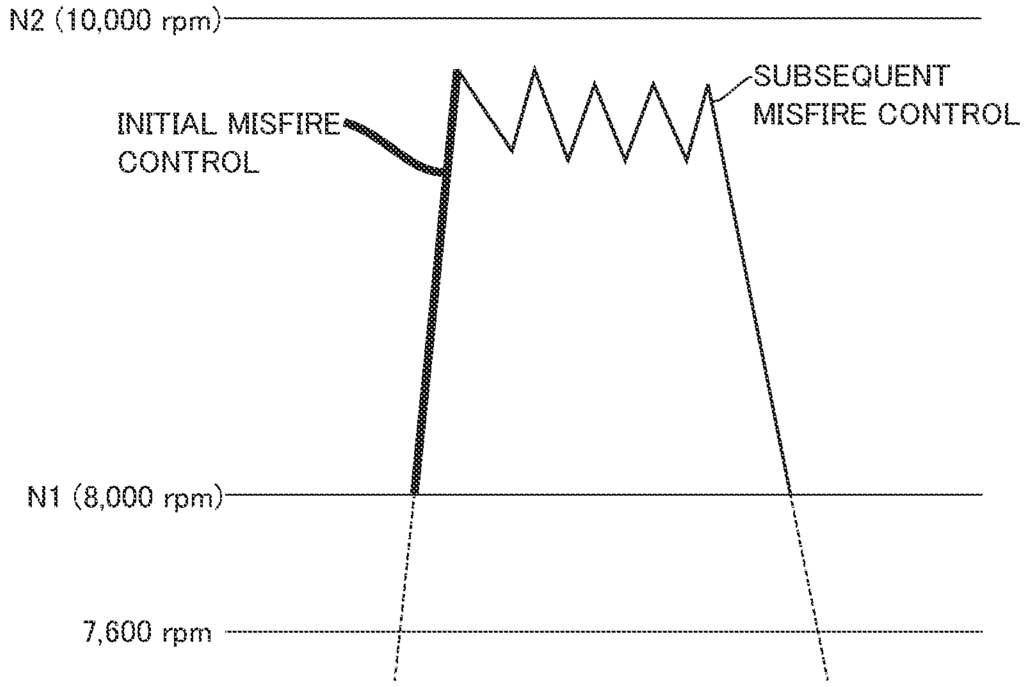
FIG. 4 is a graph illustrating that an initial misfire control is terminated and a subsequent misfire control is started based on the rate of change of an engine rotation speed.

As a first termination condition, it is determined in step S3 whether or not the rate of change H of the engine rotation speed N has changed to a predetermined rate of change Hb or lower (see FIG. 4). As an example, the predetermined rate of change Hb is 0. That is, it is determined whether or not the engine rotation speed N has stopped increasing. The rate of change H of the engine rotation speed N refers to the most recent amount of change in the engine rotation speed N per minute time. The rate of change H [rpm/ms] of the engine rotation speed N is calculated by dividing an engine rotation speed ΔN [rpm] that changes within a minute time Δt [ms] by the minute time Δt. That is, the rate of change H of the engine rotation speed N corresponds to an instantaneous value of the slope of the engine rotation speed N.

Figure 5:
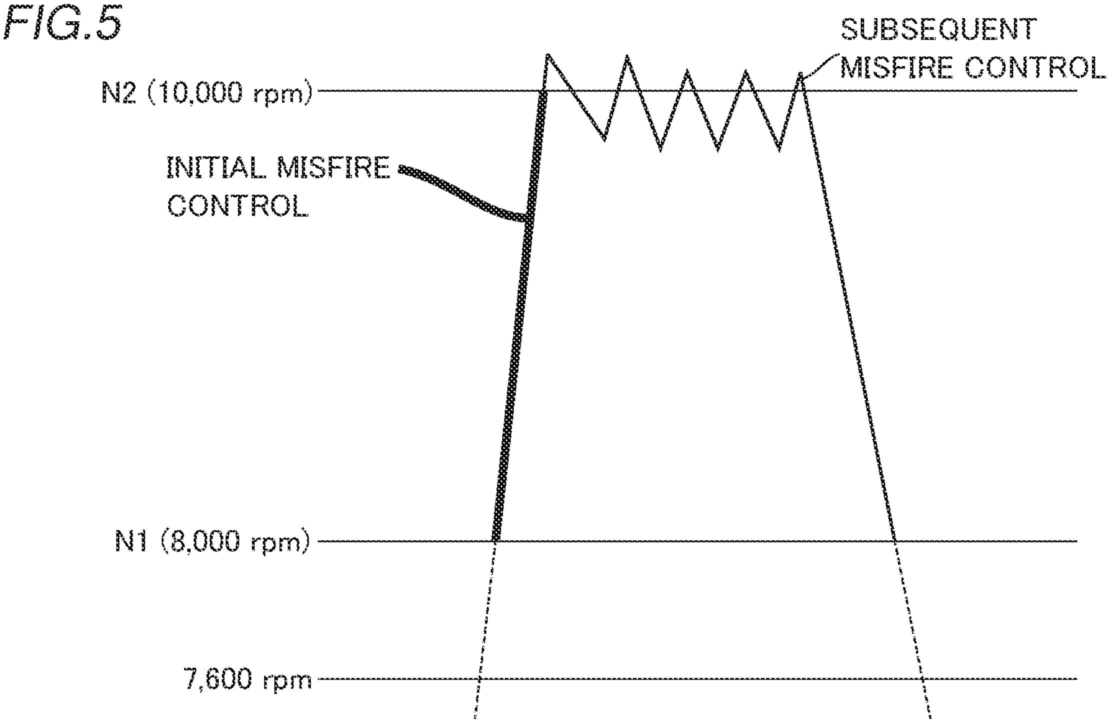
FIG. 5 is a graph illustrating that an initial misfire control is terminated and a subsequent misfire control is started based on a second engine rotation speed.

As a second termination condition, it is determined in step S3 whether or not the engine rotation speed N has become higher than a second rotation speed N2 (see FIG. 5). As an example, the second rotation speed N2 is 10,000 rpm. The second engine speed N2 is higher than at least a fourth misfire rotation speed N14 described below.

In step S4, the rev-up determination is set to 0. Then, the process advances to step S5.

In step S5, it is determined whether or not the rate of change H of the engine rotation speed N is equal to or greater than the predetermined threshold Ha based on the detection results of the rotation speed detector 4. As an example, the predetermined threshold Ha is 102 rpm/ms. When the rate of change H of the engine rotation speed N is equal to or greater than the predetermined threshold Ha, the process advances to step S6, and when the rate of change H of the engine rotation speed N is less than the predetermined threshold Ha, the process advances to step S8.

In step S6, an initial misfire control determination is set to 1. Then, the process advances to step S7.

In step S7, all of the cylinders 1*a* are caused to misfire. Thus, the initial sudden increase in the engine rotation speed N that causes over-revving is reduced or prevented. Then, the process advances to RETURN and returns to step S1. The term "misfire" indicates that in the cycle of the engine 1 in which intake, compression, explosion, and exhaust are repeated, explosion is not performed only once.

In step S8, the initial misfire control determination is set to 0. Then, the process advances to step S9.

In the subsequent misfire control in step S9 to step S16, the controller 5 causes the cylinders 1*a* to misfire when the engine rotation speed N is equal to or higher than a misfire rotation speed, which is a predetermined rotation speed higher than the first rotation speed N1. The misfire rotation speed includes a first misfire rotation speed N11, a second misfire rotation speed N12 higher than the first misfire rotation speed N11, a third misfire rotation speed N13 higher than the second misfire rotation speed N12, and a fourth misfire rotation speed N14 higher than the third misfire rotation speed N13. As an example, a difference between the second misfire rotation speed N12 and the third misfire rotation speed N13 is greater than a difference between the first misfire rotation speed N11 and the second misfire rotation speed N12. Furthermore, a difference between the third misfire rotation speed N13 and the fourth misfire rotation speed N14 is greater than a difference between the first misfire rotation speed N11 and the second misfire rotation speed N12.

As a specific example, the first misfire rotation speed N11 is 8,100 rpm., the second misfire rotation speed N12 is 8,150 rpm, the third misfire rotation speed N13 is 8,600 rpm, and the fourth misfire rotation speed N14 is 8,800 rpm. The operations in step S9 to step S16 are described in order below.

In step S9, it is determined whether or not the engine rotation speed N is equal to or higher than the fourth misfire rotation speed N14. When the engine rotation speed N is equal to or higher than the fourth misfire rotation speed N14, the process advances to step S10, and when the engine rotation speed N is lower than the fourth misfire rotation speed N14, the process advances to step S11.

In step S10, the four cylinders 1*a* are caused to misfire. Then, the process advances to RETURN and returns to step S1.

In step S11, it is determined whether or not the engine rotation speed N is equal to or higher than the third misfire rotation speed N13 (lower than the fourth misfire rotation speed N14). When the engine rotation speed N is equal to or higher than the third misfire rotation speed N13, the process advances to step S12, and when the engine rotation speed N is lower than the third misfire rotation speed N13, the process advances to step S13.

In step S12, three cylinders 1*a* are caused to misfire. Then, the process advances to RETURN and returns to step S1.

In step S13, it is determined whether or not the engine rotation speed N is equal to or higher than the second misfire rotation speed N12 (lower than the third misfire rotation speed N13). When the engine rotation speed N is equal to or higher than the second misfire rotation speed N12, the process advances to step S14, and when the engine rotation speed N is lower than the second misfire rotation speed N12, the process advances to step S15.

In step S14, two cylinders 1*a* are caused to misfire. Then, the process advances to RETURN and returns to step S1.

In step S15, it is determined whether or not the engine rotation speed N is equal to or higher than the first misfire rotation speed N11 (lower than the second misfire rotation speed N12). When the engine rotation speed N is equal to or higher than the first misfire rotation speed N11, the process advances to step S16. When the engine rotation speed N is lower than the first misfire rotation speed N11, the process advances to RETURN and returns to step S1.

In step S16, one cylinder 1*a* is caused to misfire. Then, the process returns to step S1. The controller 5 terminates the subsequent misfire control when it is determined that the engine rotation speed N has become lower than the first rotation speed N1.

According to the various preferred embodiments of the present invention described above, the following advantageous effects are achieved.

According to a preferred embodiment of the present invention, the controller 5 is configured or programmed to perform the initial misfire control to determine whether or not the cylinders 1*a* of the engine 1 are caused to misfire in order to suppress the engine rotation speed N when it is determined that the initial sudden increase in the engine rotation speed N that causes over-revving has occurred based on the detection results of the rotation speed detector 4, and perform the subsequent misfire control to determine whether or not the cylinders 1*a* are caused to misfire in order to suppress the engine rotation speed N when it is determined that the subsequent sudden increase in the engine rotation speed N that causes over-revving has occurred following the initial sudden increase in the engine rotation speed N based on the detection results of the rotation speed detector 4. Accordingly, the initial sudden increase in the engine rotation speed N that causes over-revving and the subsequent sudden increase in the engine rotation speed N that causes over-revving following the initial sudden increase in the engine rotation speed N are reduced or prevented by the initial misfire control and the subsequent misfire control different from each other. That is, the misfire control for an initial sharp rise that causes over-revving in which in particular, the rate of change H of the engine rotation speed N tends to increase and the engine rotation speed N tends to increase suddenly, and the misfire control for a subsequent sharp rise that causes over-revving are clearly separated. Furthermore, in the subsequent misfire control, misfires of the cylinders 1*a* are not performed in consideration of the rate of change H of the engine rotation speed N, and thus when the subsequent sudden increase in the engine rotation speed N is reduced or prevented, conventional unnecessary misfires are reduced or prevented. Consequently, the engine rotation speed N is stabilized at the time of the sharp rise that causes over-revving.

According to a preferred embodiment of the present invention, the outboard motor 101 includes the rotation speed detector 4 to detect the engine rotation speed N, and the controller 5 is configured or programmed to start the initial misfire control when it is determined that the engine rotation speed N has changed from lower than the first rotation speed N1, which is the predetermined rotation speed equal to or higher than the full-open rotation speed at which the opening degree of the throttle valve 10 of the engine 1 is substantially fully opened, to the first rotation speed N1 or higher. Accordingly, the engine rotation speed N has changed from lower than the first rotation speed N1, which is the predetermined rotation speed equal to or higher than the full-open rotation speed at which the opening degree of the throttle valve 10 of the engine 1 is substantially fully opened, to the first rotation speed N1 or higher such that the occurrence of the initial sudden increase in the engine rotation speed N that causes over-revving is easily predicted, and the initial misfire control is started.

According to a preferred embodiment of the present invention, the controller 5 is configured or programmed to, when it is determined that the index value indicating the rate of change H of the engine rotation speed N is equal to or greater than the predetermined threshold Ha based on the detection results of the rotation speed detector 4 in the initial misfire control, determine that the initial sudden increase in the engine rotation speed N that causes over-revving has occurred and cause the cylinders 1*a* to misfire. Accordingly, the controller 5 determines that the index value indicating the rate of change H of the engine rotation speed N is equal to or greater than the predetermined threshold Ha to accurately determine that the initial sudden increase in the engine rotation speed N that causes over-revving has occurred. Therefore, in the initial misfire control, the cylinders 1*a* are caused to misfire at an appropriate timing.

According to a preferred embodiment of the present invention, the controller 5 is configured or programmed to terminate the initial misfire control and start the subsequent misfire control when it is determined that the engine rotation speed N satisfies the predetermined termination condition in the initial misfire control. Accordingly, the subsequent misfire control is started at the time at which the initial sudden increase in the engine rotation speed N that causes over-revving ends and the subsequent sudden increase in the engine rotation speed N that causes over-revving begins.

According to a preferred embodiment of the present invention, the controller 5 is configured or programmed to determine again whether or not the index value indicating the rate of change H of the engine rotation speed N is equal to or greater than the predetermined threshold Ha when it is determined that the engine rotation speed N does not satisfy the predetermined termination condition. Accordingly, when the engine rotation speed N is expected to still increase in the initial misfire control, it is again determined whether or not the index value indicating the rate of change H of the engine rotation speed N is equal to or greater than the predetermined threshold Ha in order to cause the cylinders 1*a* to misfire without terminating the initial misfire control.

According to a preferred embodiment of the present invention, the controller 5 is configured or programmed to determine that the engine rotation speed N satisfies the predetermined termination condition when the index value indicating the rate of change H of the engine rotation speed N has changed to the predetermined rate of change Hb or lower in the initial misfire control. Accordingly, at the time at which the subsequent sudden increase in the engine rotation speed N that causes over-revving begins, the initial misfire control is terminated, and the subsequent misfire control is started.

According to a preferred embodiment of the present invention, the controller 5 is configured or programmed to determine that the engine rotation speed N satisfies the predetermined termination condition when the index value indicating the rate of change H of the engine rotation speed N has changed to 0 or less in the initial misfire control. Accordingly, at the time at which the engine rotation speed N stops increasing, the initial misfire control is terminated, and the subsequent misfire control is started.

According to a preferred embodiment of the present invention, the outboard motor 101 further includes the rotation speed detector 4 to detect the engine rotation speed N, and the controller 5 is configured or programmed to, in the initial misfire control, determine that the engine rotation speed N satisfies the predetermined termination condition when the engine rotation speed N has become higher than the second rotation speed N2 or when the engine rotation speed N has become equal to or lower than the second rotation speed N2 after becoming higher than the second rotation speed N2. Accordingly, the initial misfire control is switched to the subsequent misfire control based on the second rotation speed N2 taking into consideration the allowable rotation speed that must be prevented from being reached.

According to a preferred embodiment of the present invention, the engine 1 includes the plurality of cylinders 1*a*, and the controller 5 is configured or programmed to cause all of the cylinders 1*a* to misfire when it is determined that the index value indicating the rate of change H of the engine rotation speed N is equal to or greater than the predetermined threshold in the initial misfire control. Accordingly, all of the cylinders 1*a* are caused to misfire such that the initial sharp rise that causes over-revving in which the engine rotation speed N increases suddenly is effectively reduced or prevented.

According to a preferred embodiment of the present invention, the engine 1 includes the plurality of cylinders 1*a*, and the controller 5 is configured or programmed to increase the number of misfiring cylinders 1*a* as the index value indicating the rate of change H of the engine rotation speed N increases when it is determined that the index value indicating the rate of change H of the engine rotation speed N is equal to or greater than the predetermined threshold Ha in the initial misfire control. Accordingly, the number of misfiring cylinders 1*a* is varied when the rate of change H of the engine rotation speed N is particularly high or particularly low in the initial misfire control. Therefore, the engine rotation speed N is further stabilized at the time of the sharp rise that causes over-revving.

According to a preferred embodiment of the present invention, the index value indicating the rate of change H of the engine rotation speed N is the engine rotation speed N used to calculate the rate of change H of the engine rotation speed N, the load value of the fuel injector 11 of the engine 1 that changes in conjunction with the rate of change H of the engine rotation speed N, or the opening degree value of the throttle valve 10 of the engine 1 that changes in conjunction with the rate of change H of the engine rotation speed N. Accordingly, in engines of various specifications with different detectable index values, misfires of cylinders are controlled.

According to a preferred embodiment of the present invention, the controller 5 is configured or programmed to cause the cylinders 1*a* to misfire when the engine rotation speed N is equal to or higher than the misfire rotation speed, which is the predetermined rotation speed higher than the first rotation speed N1 in the subsequent misfire control. Accordingly, the misfire rotation speed is set to a relatively high value in the subsequent misfire control such that the engine rotation speed N is maintained at a relatively high value in the subsequent misfire control.

According to a preferred embodiment of the present invention, the engine 1 includes the four cylinders 1*a*, and the misfire rotation speed includes the first misfire rotation speed N11, the second misfire rotation speed N12 higher than the first misfire rotation speed N11, the third misfire rotation speed N13 higher than the second misfire rotation speed N12, and the fourth misfire rotation speed N14 higher than the third misfire rotation speed N13. Furthermore, the controller 5 is configured or programmed to cause one cylinder 1*a* to misfire when the engine rotation speed N is equal to or higher than the first misfire rotation speed N11 and lower than the second misfire rotation speed N12 in the subsequent misfire control, cause two cylinders 1*a* to misfire when the engine rotation speed N is equal to or higher than the second misfire rotation speed N12 and lower than the third misfire rotation speed N13 in the subsequent misfire control, cause three cylinders 1*a* to misfire when the engine rotation speed N is equal to or higher than the third misfire rotation speed N13 and lower than the fourth misfire rotation speed N14 in the subsequent misfire control, and cause the four cylinders 1*a* to misfire when the engine rotation speed N is equal to or higher than the fourth misfire rotation speed N14 in the subsequent misfire control. The difference between the second misfire rotation speed N12 and the third misfire rotation speed N13 and the difference between the third misfire rotation speed N13 and the fourth misfire rotation speed N14 are greater than the difference between the first misfire rotation speed N11 and the second misfire rotation speed N12. Accordingly, the third misfire rotation speed N13 and the fourth misfire rotation speed N14 are set to a relatively high value with respect to the first misfire rotation speed N11 and the second misfire rotation speed N12, and thus in the subsequent misfire control, misfires of a large number of cylinders that significantly decrease the engine rotation speed N are reduced or prevented. Consequently, the engine rotation speed N is further stabilized at the time of the sharp rise that causes over-revving.

According to a preferred embodiment of the present invention, the controller 5 is configured or programmed to terminate the subsequent misfire control when it is determined that the engine rotation speed N has become lower than the first rotation speed N1. Accordingly, based on the engine rotation speed N, it is determined that the subsequent sudden increase in the engine rotation speed N that causes over-revving has ceased, and the subsequent misfire control is terminated.

According to a preferred embodiment of the present invention, the first rotation speed N1 is 5,000 rpm or more, for example, and 10,000 rpm or less, for example. Accordingly, when the engine rotation speed N is less than 5,000 rpm and when the engine rotation speed N is more than 10,000 rpm, the initial misfire control is prevented from being started.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while the marine propulsion device is preferably an outboard motor in preferred embodiments described above, the present invention is not restricted to this. In a preferred embodiment of the present invention, the marine propulsion device may alternatively be an inboard motor, an inboard-outboard motor, or a jet propulsion device, for example.

While only one outboard motor is preferably provided on the hull in preferred embodiments described above, the present invention is not restricted to this. In a preferred embodiment of the present invention, a plurality of outboard motors may alternatively be provided on the hull.

While the engine of the outboard motor preferably includes four cylinders in preferred embodiments described above, the present invention is not restricted to this. In a preferred embodiment of the present invention, the number of cylinders of the engine of the outboard motor may alternatively be different from four.

While the initial misfire control is preferably terminated when at least one of the conditions that the rate of change of the engine rotation speed has changed to the predetermined rate of change or lower and that the engine rotation speed has become higher than the second rotation speed is satisfied in preferred embodiments described above, the present invention is not restricted to this. In a preferred embodiment of the present invention, the initial misfire control may alternatively be terminated when at least one of the conditions that the rate of change of the engine rotation speed has changed to the predetermined rate of change or lower and that the engine rotation speed has become equal to or lower than the second rotation speed after becoming higher than the second rotation speed is satisfied. In addition, the initial misfire control may alternatively be terminated only when the rate of change of the engine rotation speed has changed to the predetermined rate of change or lower. Furthermore, the initial misfire control may alternatively be terminated only when the engine rotation speed has become higher than the second rotation speed. Moreover, the termination conditions of the initial misfire control may alternatively further include that a predetermined period of time has elapsed since the start of the initial misfire control. That is, when the predetermined period of time has elapsed since the start of the initial misfire control, the initial misfire control may be terminated upon expiration.

While the controller preferably performs a control to cause all of the cylinders to misfire when it is determined that the index value indicating the rate of change of the engine rotation speed is equal to or greater than the predetermined threshold in the initial misfire control in preferred embodiments described above, the present invention is not restricted to this. In a preferred embodiment of the present invention, the controller may alternatively increase the number of misfiring cylinders as the index value indicating the rate of change of the engine rotation speed increases when it is determined that the index value indicating the rate of change of the engine rotation speed is equal to or greater than the predetermined threshold in the initial misfire control.

While the rev-up detector is preferably a rotation speed detector in preferred embodiments described above, the present invention is not restricted to this. In a preferred embodiment of the present invention, the rev-up detector may alternatively be the load detector of the fuel injector or an ECU that changes the opening degree value of the throttle valve.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine propulsion device comprising:

an engine;

a rev-up detector to detect a sudden increase in an engine rotation speed; and a controller configured or programmed to perform a control to suppress the engine rotation speed; wherein the controller is configured or programmed to:

perform an initial misfire control to determine whether or not a cylinder of the engine is to be misfired in order to suppress the engine rotation speed when it is determined that an initial sudden increase in the engine rotation speed that causes over-revving has occurred based on a detection result from the rev-up detector, and to misfire the cylinder in the initial misfire control when it is determined that the cylinder is to be misfired; and perform a subsequent misfire control to determine whether or not the cylinder is to be misfired in order to suppress the engine rotation speed when it is determined that a subsequent sudden increase in the engine rotation speed that causes the over-revving has occurred following the initial sudden increase in the engine rotation speed based on the detection result from the rev-up detector, and to misfire the cylinder in the subsequent misfire control when it is determined that the cylinder is to be misfired.

2. The marine propulsion device according to claim 1, wherein the rev-up detector is a rotation speed detector to detect the engine rotation speed; and the controller is configured or programmed to start the initial misfire control when it is determined that the engine rotation speed has changed from lower than a first rotation speed, which is a predetermined rotation speed equal to or higher than a full-open rotation speed at which an opening degree of a throttle valve of the engine is substantially fully opened, to the first rotation speed or higher.

3. The marine propulsion device according to claim 1, wherein the controller is configured or programmed to, when it is determined that an index value indicating a rate of change of the engine rotation speed is equal to or greater than a predetermined threshold based on the detection result from the rev-up detector in the initial misfire control, determine that the initial sudden increase in the engine rotation speed that causes the over-revving has occurred and cause the cylinder to misfire.

4. The marine propulsion device according to claim 3, wherein the controller is configured or programmed to terminate the initial misfire control and start the subsequent misfire control when it is determined that the engine rotation speed satisfies a predetermined termination condition in the initial misfire control.

5. The marine propulsion device according to claim 4, wherein the controller is configured or programmed to determine again whether or not the index value indicating the rate of change of the engine rotation speed is equal to or greater than the predetermined threshold when it is determined that the engine rotation speed does not satisfy the predetermined termination condition.

6. The marine propulsion device according to claim 4, wherein the controller is configured or programmed to determine that the engine rotation speed satisfies the predetermined termination condition when the index value indicating the rate of change of the engine rotation speed has changed to a predetermined rate of change or lower in the initial misfire control.

7. The marine propulsion device according to claim 6, wherein the controller is configured or programmed to determine that the engine rotation speed satisfies the predetermined termination condition when the index value indicating the rate of change of the engine rotation speed has changed to 0 or less in the initial misfire control.

8. The marine propulsion device according to claim 4, wherein the rev-up detector is a rotation speed detector to detect the engine rotation speed; and the controller is configured or programmed to, in the initial misfire control, determine that the engine rotation speed satisfies the predetermined termination condition when the engine rotation speed has become higher than a second rotation speed or when the engine rotation speed has become equal to or lower than the second rotation speed after becoming higher than the second rotation speed.

9. The marine propulsion device according to claim 3, wherein the cylinder of the engine includes a plurality of cylinders; and the controller is configured or programmed to cause all of the cylinders to misfire when it is determined that the index value indicating the rate of change of the engine rotation speed is equal to or greater than the predetermined threshold in the initial misfire control.

10. The marine propulsion device according to claim 3, wherein the cylinder of the engine includes a plurality of cylinders; and the controller is configured or programmed to increase a number of misfiring cylinders as the index value indicating the rate of change of the engine rotation speed increases when it is determined that the index value indicating the rate of change of the engine rotation speed is equal to or greater than the predetermined threshold in the initial misfire control.

11. The marine propulsion device according to claim 3, wherein the index value indicating the rate of change of the engine rotation speed is the engine rotation speed used to calculate the rate of change of the engine rotation speed, a load value of a fuel injector of the engine that changes in conjunction with the rate of change of the engine rotation speed, or an opening degree value of a throttle valve of the engine that changes in conjunction with the rate of change of the engine rotation speed.

12. The marine propulsion device according to claim 2, wherein the controller is configured or programmed to cause the cylinder to misfire when the engine rotation speed is equal to or higher than a misfire rotation speed higher than the first rotation speed in the subsequent misfire control.

13. The marine propulsion device according to claim 12, wherein the engine includes four cylinders;

the misfire rotation speed includes a first misfire rotation speed, a second misfire rotation speed higher than the first misfire rotation speed, a third misfire rotation speed higher than the second misfire rotation speed, and a fourth misfire rotation speed higher than the third misfire rotation speed;

the controller is configured or programmed to:

cause one of the four cylinders to misfire when the engine rotation speed is equal to or higher than the first misfire rotation speed and lower than the second misfire rotation speed in the subsequent misfire control;

cause two of the four cylinders to misfire when the engine rotation speed is equal to or higher than the second misfire rotation speed and lower than the third misfire rotation speed in the subsequent misfire control;

cause three of the four cylinders to misfire when the engine rotation speed is equal to or higher than the third misfire rotation speed and lower than the fourth misfire rotation speed in the subsequent misfire control; and cause all of the four cylinders to misfire when the engine rotation speed is equal to or higher than the fourth misfire rotation speed in the subsequent misfire control; and a difference between the second misfire rotation speed and the third misfire rotation speed and a difference between the third misfire rotation speed and the fourth misfire rotation speed are greater than a difference between the first misfire rotation speed and the second misfire rotation speed.

14. The marine propulsion device according to claim 12, wherein the controller is configured or programmed to terminate the subsequent misfire control when it is determined that the engine rotation speed has become lower than the first rotation speed.

15. The marine propulsion device according to claim 2, wherein the first rotation speed is 5,000 rpm or more and 10,000 rpm or less.

16. A marine vessel comprising:

a hull; and a marine propulsion device provided on the hull and including:

an engine;

a rev-up detector to detect a sudden increase in an engine rotation speed; and a controller configured or programmed to perform a control to suppress the engine rotation speed; wherein the controller is configured or programmed to:

perform an initial misfire control to determine whether or not a cylinder of the engine is to be misfired in order to suppress the engine rotation speed when it is determined that an initial sudden increase in the engine rotation speed that causes over-revving has occurred based on a detection result from the rev-up detector, and to misfire the cylinder in the initial misfire control when it is determined that the cylinder is to be misfired; and perform a subsequent misfire control to determine whether or not the cylinder is to be misfired in order to suppress the engine rotation speed when it is determined that a subsequent sudden increase in the engine rotation speed that causes the over-revving has occurred following the initial sudden increase in the engine rotation speed based on the detection result from the rev-up detector, and to misfire the cylinder in the subsequent misfire control when it is determined that the cylinder is to be misfired.

17. The marine vessel according to claim 16, wherein the rev-up detector is a rotation speed detector to detect the engine rotation speed; and the controller is configured or programmed to start the initial misfire control when it is determined that the engine rotation speed has changed from lower than a first rotation speed, which is a predetermined rotation speed equal to or higher than a full-open rotation speed at which an opening degree of a throttle valve of the engine is substantially fully opened, to the first rotation speed or higher.

18. The marine vessel according to claim 16, wherein the controller is configured or programmed to, when it is determined that an index value indicating a rate of change of the engine rotation speed is equal to or greater than a predetermined threshold based on the detection result from the rev-up detector in the initial misfire control, determine that the initial sudden increase in the engine rotation speed that causes the over-revving has occurred and cause the cylinder to misfire.

19. The marine vessel according to claim 18, wherein the controller is configured or programmed to terminate the initial misfire control and start the subsequent misfire control when it is determined that the engine rotation speed satisfies a predetermined termination condition in the initial misfire control.

20. The marine vessel according to claim 19, wherein the controller is configured or programmed to determine again whether or not the index value indicating the rate of change of the engine rotation speed is equal to or greater than the predetermined threshold when it is determined that the engine rotation speed does not satisfy the predetermined termination condition.

* * * * *